UNITED STATES PATENT OFFICE.

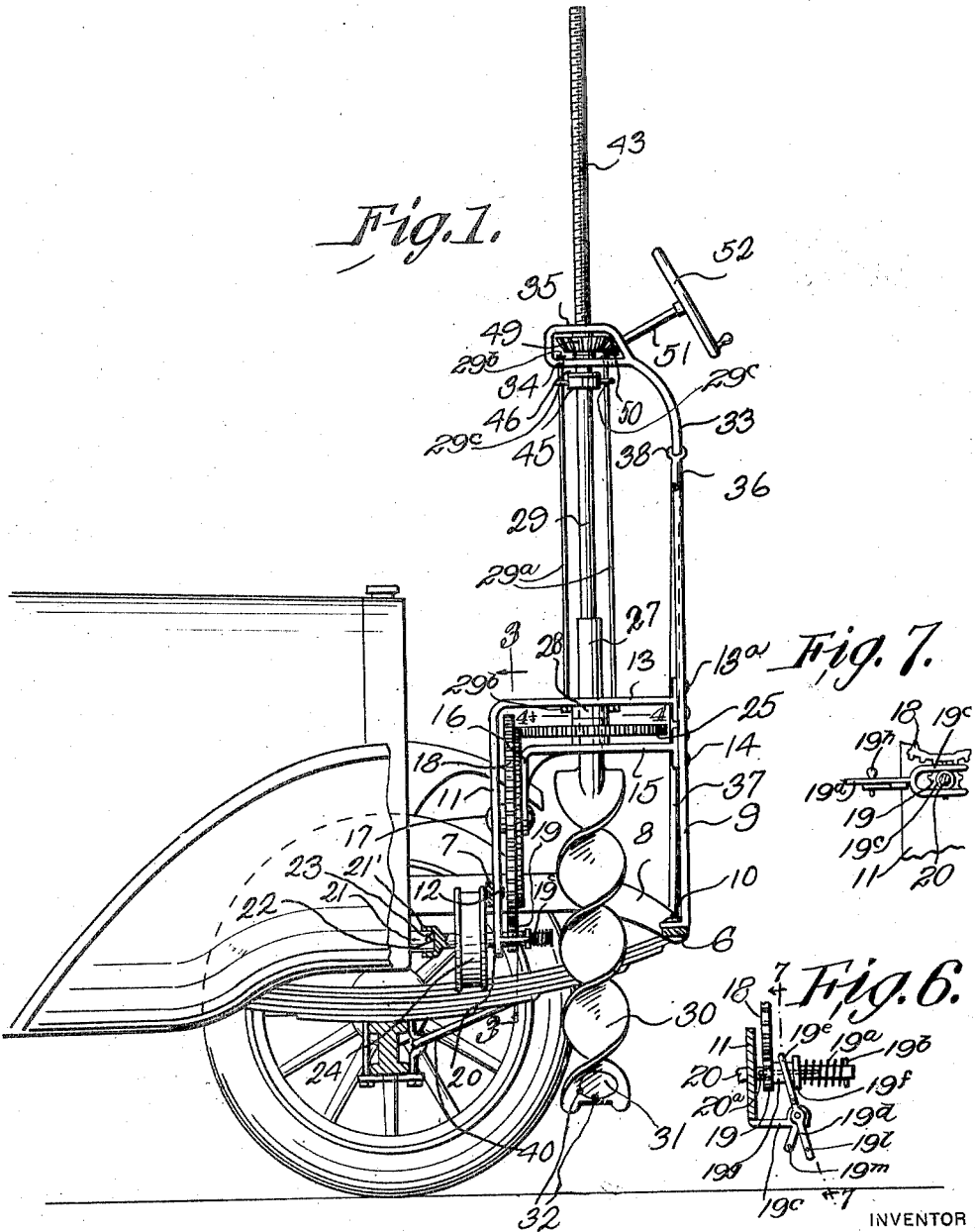
L. MAGGS.
POST HOLE DIGGER.
APPLICATION FILED APR. 15, 1918.
1,287,377. Patented Dec. 10, 1918.
2 SHEETS—SHEET 1.
INVENTOR
Lee Maggs,
WITNESSES
R. W. Hoagland
BY Richard Owen.
ATTORNEY L. MAGGS.
POST HOLE DIGGER.
APPLICATION FILED APR. 15, 1918.
1,287,377.
Patented Dec. 10, 1918.
2 SHEETS—SHEET 2.
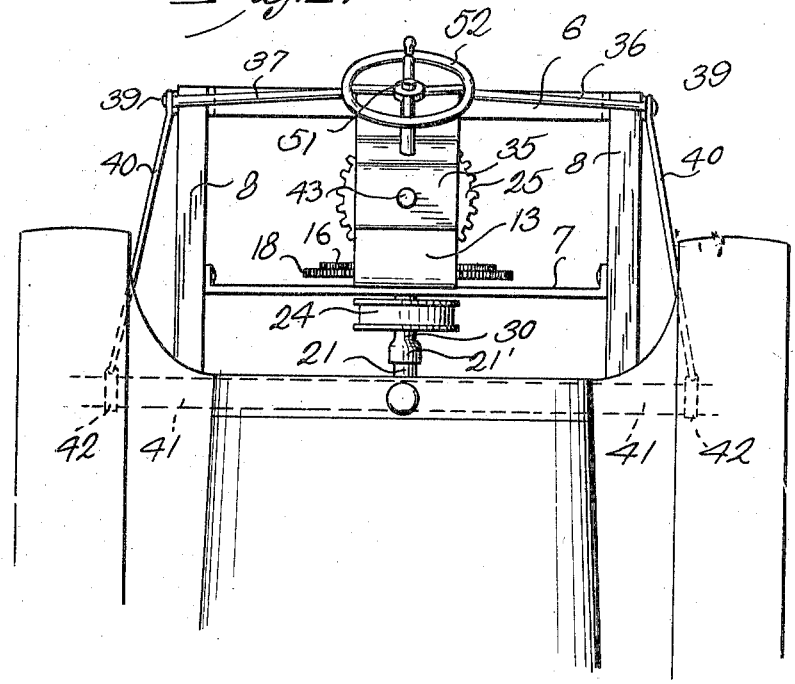
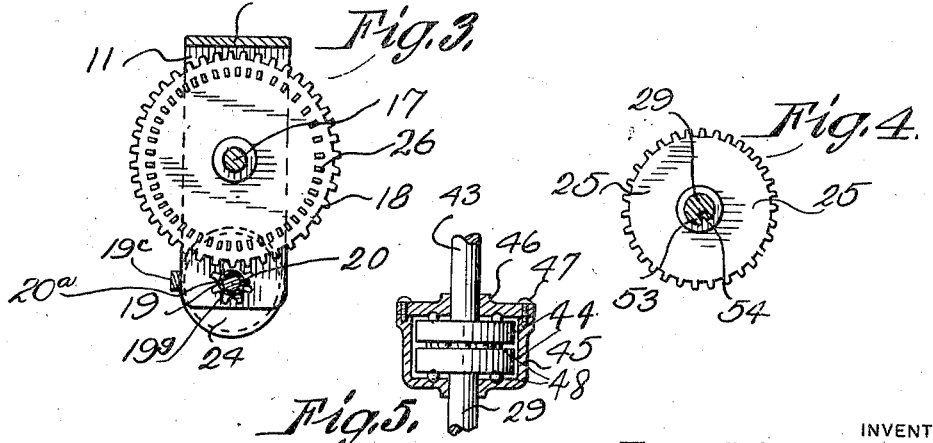
INVENTOR
Lee Maggs,
WITNESSES
R. W. Hoagland
BY
ATTORNEY

LEE MAGGS, OF IDALIA, COLORADO.

POST-HOLE DIGGER.

1,287,377.

Specification of Letters Patent. Patented Dec. 10, 1918.

Application filed April 15, 1918. Serial No. 228,663.

*To all whom it may concern:*

Be it known that I, LEE MAGGS, a citizen of the United States, residing at Idalia, in the county of Yuma and State of Colorado, have invented certain new and useful Improvements in Post-Hole Diggers, of which the following is a specification.

This invention relates to an earth drilling or post-hole digging machine and its main object is to provide a novel, durable and practical construction which may be coupled to and driven from an automobile engine.

Various servient objects will be pointed out and claimed hereinafter in connection with the following detailed description of a preferred embodiment, taken in connection with accompanying drawings, wherein:—

Figure 1 is a side elevation, partly broken away, of the front portion of an automobile with my improvements attached thereto;

Fig. 2 is a top or plan view of the parts of Fig. 1;

Fig. 3 is a cross sectional view through my improvements only, taken along the line 3—3 of Fig. 1;

Fig. 4 is a detail cross sectional view on the line 4—4 of Fig. 1, and

Fig. 5 is a detail vertical sectional view taken through the coupling means between the feed screw and the auger rod.

Fig. 6 is a detail showing the pinion to drive the drill, and

Fig. 7 is a sectional view on line 7—7 of Fig. 6.

Referring specifically to the drawings, a suitable supporting frame is first provided for the working parts. To this end transverse bars 6 and 7 may be detachably secured to the side beams 8 of the automobile chassis. These bars serve as the base upon which the remainder of the machine is built. A relatively wide bearing 9 is fastened at 10 to the bar 6 and a bearing 11 is fastened at 12 to the bar 7 and has a horizontal, forwardly extending arm 13 fastened to the bearing 9 at 13ª. Another bearing is fastened at 14 to bearing 9 and has a horizontal portion 15 and a vertical portion 16. In the vertical arm of bearing 11 and portion 16, a shaft 17 is fastened, on which, intermediate the bearing 11 and portion 16, a gear wheel 18 is keyed. This gear wheel 18 meshes with a small gear wheel or pinion 19, keyed to a shaft 20, journaled in the vertical arm of bearing 11. Shaft 20 is to be detachably connected in any suitable manner to the crank shaft 21 of the automobile engine. As one means of connection, I suggest that the shaft 20 have a socket 21', with a pin 22 extending inwardly therefrom so as to extend into a diagonal slot 23 in the crank shaft. On shaft 20, a drum 24 is fixed over which a belt or cable may be passed and pulled to frictionally grip its periphery and give it an initial impulse to start the engine.

Pinion 19 is preferably mounted to slide longitudinally on the shaft 20 in order to disengage gear wheel 18 when the drill is inactive. A spring 19ª bears against pinion 19 and a pin 19ᵇ on shaft 20 and normally keeps these gear wheels in mesh. An arm 19ᶜ extends from arm 11 and a lever 19ᵈ is pivoted thereon having a yoke 19ᵉ engaging a flange 19ᶠ on a reduced collar 19ᵍ of pinion 19, to slide the pinion against the tension of spring 19ª. The lever may be secured in the shifted position by means of a pin 19ʰ passing through holes 19ⁱ and 19ᵐ in the lever and arm 19ᶜ. A spline 20ª extends from the shaft 20 into a slot in the pinion 19 so the pinion will not turn independently of the shaft.

Intermediate the arms 13 and 15, a gear wheel 25 is disposed, having teeth to mesh with teeth 26 extending laterally from the gear wheel 18. In lieu of the teeth 26 and gear wheel 25, I may employ bevel gear wheels. if desired. Slidable vertically through the gear wheel 25, bars 13 and 15, an upstanding bearing 27 and a depending bearing 28 of the arm 13 is a rod 29 extending rigidly from an auger 30, which digs the post hole or excavates for other purposes. This auger may have a plate 31 pivoted thereto at 32 so as to fold against the base of the auger groove when boring and so as to fall outwardly when the auger is raised to form in effect a closure for the groove to prevent the return of bored earth to the hole.

Bearing 9 extends above the arm 13 at a portion 33 and then inwardly to form a bearing having spaced plates 34 and 35. Portion 33 is suitably braced against lateral strain and to this end substantially vertical rods 36 and 37 are fastened thereto at 38. These rods, at 39 are fastened to horizontal rods 40 and to the beams 8. Rods 40 are suitably fastened to the axle 41 of the automobile at 42.

A screw rod 43 passes loosely through plates 34 and 35 and at its lower end is suitably secured to the rod 29 so as to depress the same but turn relatively thereto and independently thereof. Rods 29 and 43, therefore, by way of example, may have heads 44 (see Fig. 5) disposed in a box 45 covered by a removable plate 46 secured thereto by screws 47. Suitable bearing balls 48 may be placed at desired locations between the heads and the box and cover.

Bolts or rods 29$^a$ are removably fastened by nuts 29$^b$ to the arms 13 and 34 to rigidify the structure. These bolts pass through eyelets 29$^c$ of the box 45.

Said screw rod 43 is in threaded engagement with the bore of a bevel gear wheel 49 disposed intermediate plates 34 and 35. Meshing with this bevel gear wheel is a bevel gear wheel 50 fixed on a shaft 51, journaled in plate 35 and provided with a wheel or manipulating handle at 52.

While rod 29 is free to slide through gear wheel 25, yet it cannot turn independently thereof, because as shown in Fig. 4, said rod is provided with a groove 53 into which a key or spline 54 of the gear wheel extends.

It will be realized that the machine is detachably secured to the automobile in a manner above described. The pulley 24, being turned by a rope or cable will start the engine, whereupon shaft 20 drives pinion 19, gear wheel 18, teeth 26, gear wheel 25 and rod 29. As the rod 29 turns, the auger turns therewith and is depressed as occasion demands through manipulation of wheel 52 which through the medium of shaft 51 and bevel gear wheels 50 and 49 turns the screw rod 43 forcing it against the rod 29.

As merely one preferred embodiment of the invention has been illustrated and described, it is to be borne in mind that changes in the details of construction may be made within its spirit and scope.

I claim:—

1. In a drilling machine, a bearing, a gear wheel mounted from said bearing, a drilling means driven from said gear wheel, a shaft journaled in said bearing, a gear wheel on said shaft in mesh with the first gear wheel, means to attach said shaft to an engine, and means operable to turn said shaft to start the engine.

2. In a drilling machine, a bearing having arms disposed at an angle to each other, a second bearing, said second bearing being spaced from the first bearing and having arms substantially parallel with its arms, gearing mounted intermediate and by said arms, means to drive the gearing and drilling means driven by the gearing.

3. In a drilling machine, a bearing having arms disposed at an angle to each other, a second bearing, said second bearing being spaced from the first bearing and having arms substantially parallel with its arms, gearing intermediate and mounted by said arms, a shaft journaled by one of said arms, a gear wheel on said shaft in mesh with said gearing, means to connect said shaft to an engine, means to drive said shaft, and drilling means operable by said gearing.

4. In a drilling means, a bearing having arms disposed at an angle to each other, a second bearing, said second bearing being spaced from the first bearing and having arms substantially parallel with its arms, gearing intermediate and mounted by said arms, said gearing including a gear wheel, a rod slidable through said gear wheel, drilling means carried by said rod, means to prevent independent rotation of the gear wheel and rod, a third bearing, a turnable member mounted by said third bearing, a rod to bear on the first rod in threaded engagement with said member, and means operable to turn said second rod.

5. In a drilling machine, base bars, a bearing secured to one of said bars, having angularly disposed arms, a second bearing having angularly disposed arms, a gear wheel mounted between and to two of said arms, a second gear wheel, the latter gear wheel meshing with the first gear wheel and being mounted between the other arms, a shaft journaled in the first bearing, means to attach said shaft to an engine, means operable to drive said shaft to start the engine, drilling means having a rod slidable through but turnable with the second gear wheel, a third bearing, said third bearing being secured to the other of said bars and extending over said rod and having spaced plates, a turnable member disposed intermediate said plates, a rod in threaded engagement with said member resting on the first rod and turnable independently thereof, means to turn said member, brace means extending from the third bearing, and means to fasten the brace means to the axle of an automobile.

In testimony whereof I affix my signature in presence of two witnesses.

LEE MAGGS.

Witnesses:
FRANK HOLCOMB,
ED. RAMSIER.